Patented Jan. 30, 1923.

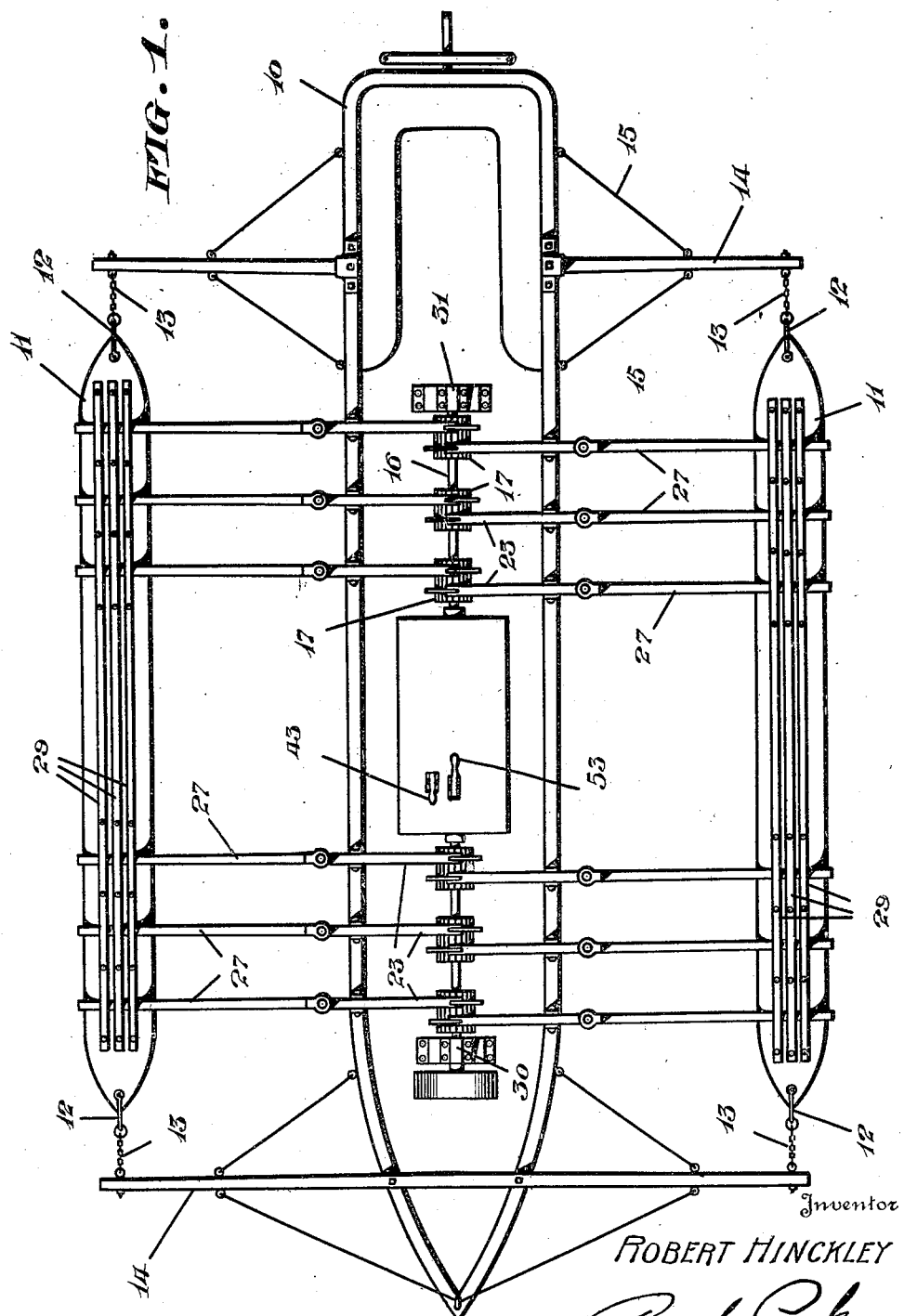

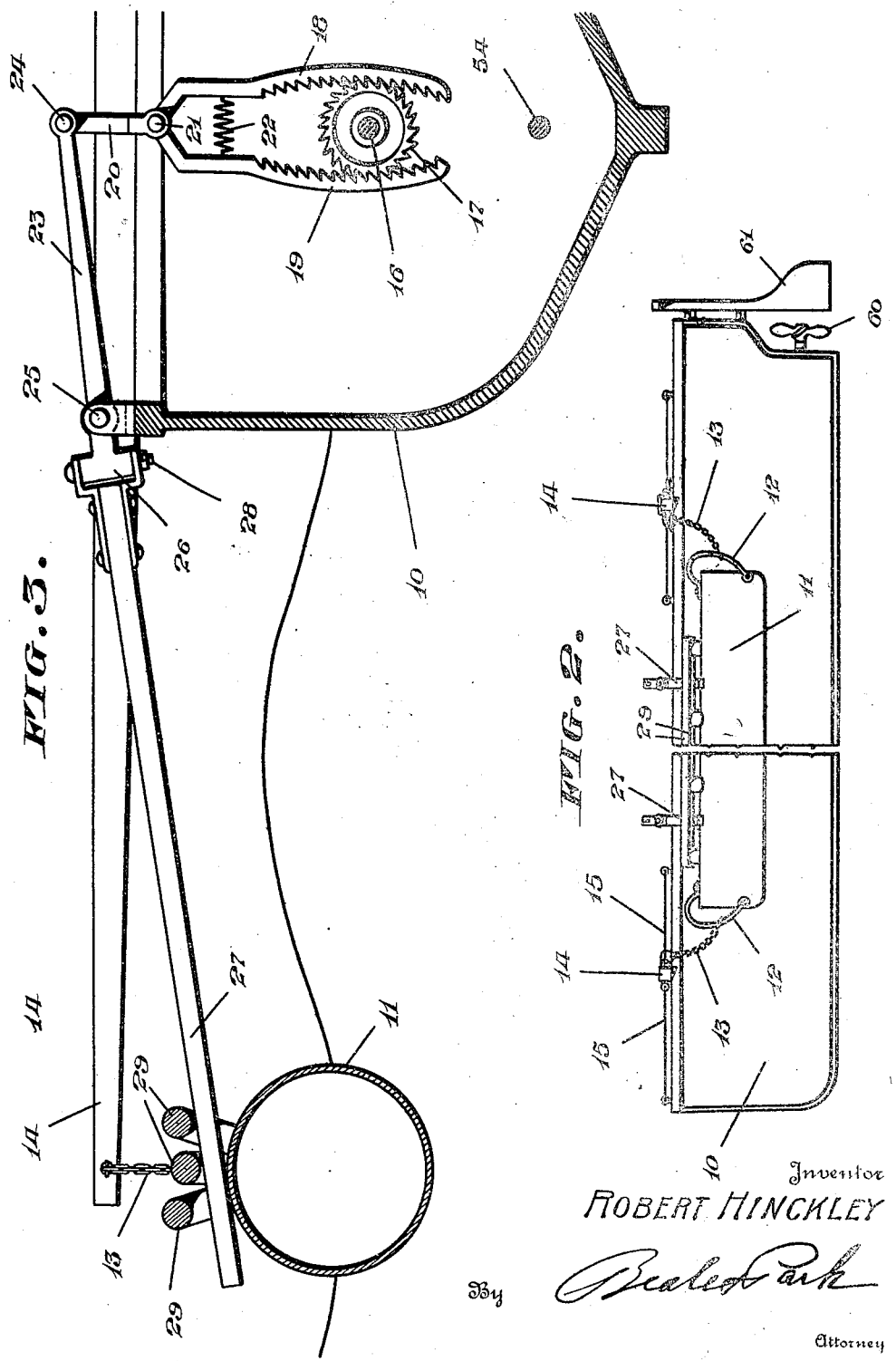

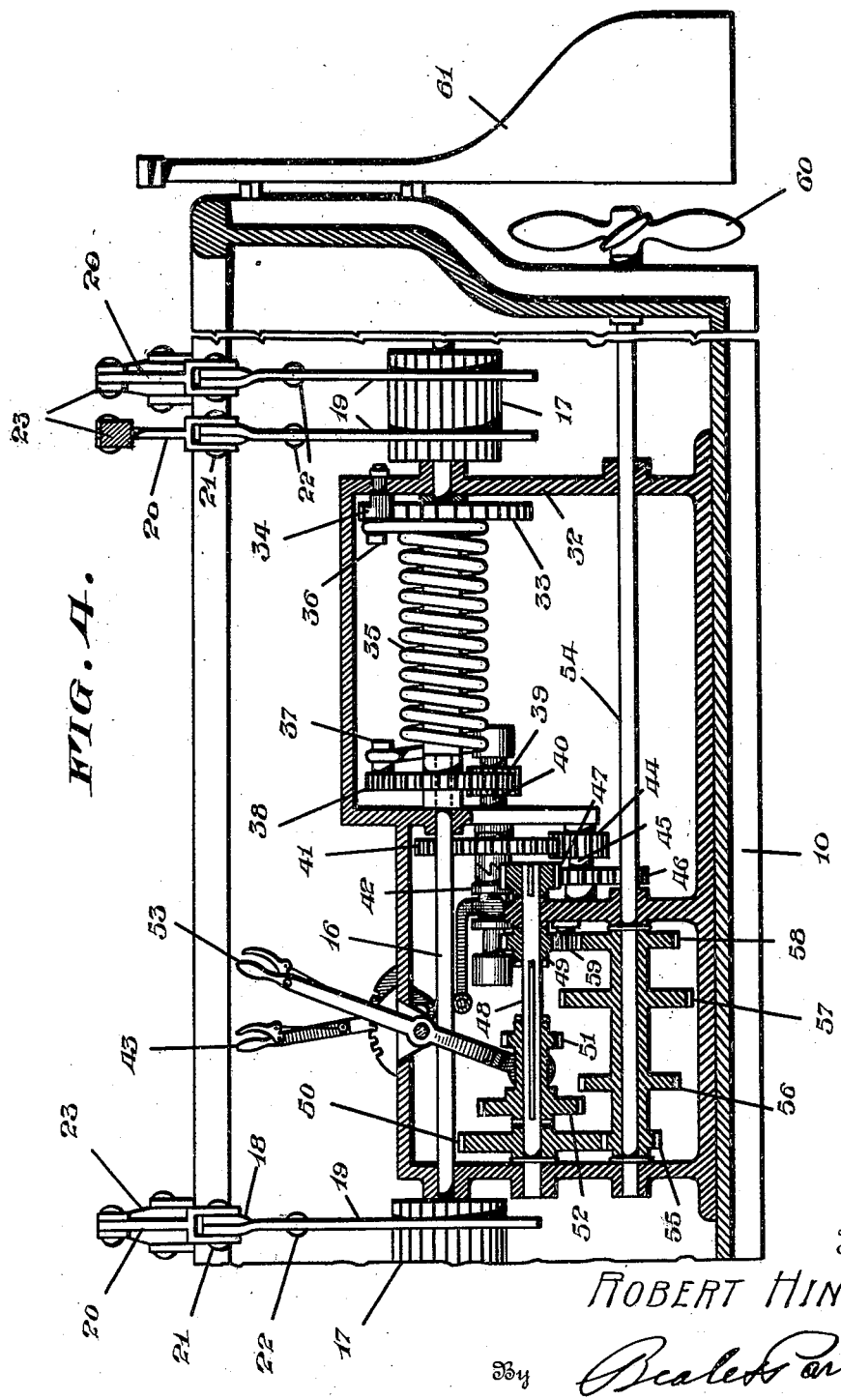

1,443,626

UNITED STATES PATENT OFFICE.

ROBERT HINCKLEY, OF WASHINGTON, DISTRICT OF COLUMBIA.

WAVE MOTOR.

Application filed November 23, 1921. Serial No. 517,231.

*To all whom it may concern:*

Be it known that I, ROBERT HINCKLEY, a citizen of the United States, residing at Washington, in the District of Columbia, have invented certain new and useful Improvements in Wave Motors; and I hereby declare that the following is a full, clear, and exact description thereof, reference being had to the accompanying drawings which form part of the specification.

My invention relates to improvements in wave motors of a simple construction that will respond quickly to every degree of wave movement and provide power for driving a shaft.

In the drawings I have shown my invention as applied for driving propeller shaft for the operation of a screw wheel of a boat. I do not, however, limit my invention to driving a screw as it is apparent that I may apply my energizing means to any shaft regardless of the ultimate power distribution of said shaft.

Referring to the drawings:—Fig. 1 is a plan view of a wave motor embodying my invention; Fig. 2 is a reduced side elevation thereof; Fig. 3 is a detail showing an end elevation, partly in cross section; Fig. 4 is a detail showing a side elevation in cross section of the transmission gearing employed.

Referring more particularly to the drawings 10 denotes a boat, barge or raft having movably attached thereto floats 11 provided with vertically disposed loop members 12, fore and aft. Chains 13 are slidably attached thereto. The other end of said chains being rigidly fastened to booms or brace rods 14 which are securely fastened to boat 10 and braced by tie rods 15. In the center of the boat and running substantially parallel to the keel is journalled a shaft 16 upon which are rigidly mounted cog wheels or cog drums 17. For engagement with these drums I have provided two arms denoted by 18 and 19 said arms being swingingly connected to each other and to a link member 20 by a bolt 21. Cogs or teeth are formed in said arms. Each arm or rack acts independently; 18 being engaged and 19 idling, on the downward stroke and upon the upward stroke the reverse is true, thus the drum is kept propelled in one direction.

It will be seen that I prefer to construct these arms or racks of curved form and to hold them together and in alternate operating contact by means of a spring 22.

Link 20 is connected to a lever arm 23 by a bolt 24. Lever arm 23 is fulcrumed on the gunwale of the boat and swingingly pinned thereto by bolt 25. A shoulder 26 is formed upon lever 23 to which spar member 27 is hinged by pintle bolt 28.

Upon floats 11 are mounted three guide rods denoted by 29 placed so as to loosely confine the outer end of spars 27. It will also be noted that these guide rods prevent the float from turning over in the water.

For the purpose of transmitting, disconnecting and regulating the wave energy I have provided a spring, clutch and variable speed gearing. I have also shown a propeller to which this power may be transmitted for the purpose of driving my boat. It is understood, however, that in case I wish to anchor my boat, I may use the wave motor power for charging a generator so that said power may be transmitted to the land for operating machinery thereon or I may use the move motor power in any other feasible manner.

Shaft 16 is journalled in boxes 30, 31 and at three points in a frame 32. A ratchet-wheel 33 is pinned to shaft 16 and has an engaging pawl 34 which is pivoted to frame 32. A coil spring is fastened at 36 to ratchet-wheel 33 and at 37 to spur-wheel 38 which wheel idles upon shaft 16 and engages pinion 39 which is pinned to shaft 40 which is journalled as shown. Upon shaft 40 is an idler gear 41 which has a hub adapted to be engaged with a clutch means 42 for connecting and disconnecting said gear 41 with said shaft 40. A hand lever 43 is appropriately connected for the operation of said clutch. Engaging said gear wheel 41 is a pinion wheel 44 pinned to a shaft 45. Another gear wheel 46 is also pinned to shaft 45 and engages pinion 47 which is keyed to shaft 48. Idling upon this shaft is reverse gear 49 and high speed gear 50. Two intermediate gears 51 and 52 connected together by a hub are slidably keyed upon shaft 48 and operated by a gear shifting lever 53. The above mentioned hub of gears 51 and 52 is provided with extending members to engage gears 49 and 50 respectively.

A shaft 54 carries four gears 55, 56, 57 and 58 pinned thereto and respectively adapted to mesh with gears 50, 52, 51 and through an intermediate 59 with gear 49.

The shaft 54 is shown as carrying a propeller 60. A conventional rudder 61 is mounted at the stern.

It will be seen from the foregoing that my device comprises a wave motor embracing a catamaran float having a center member and two outboard members connected to said center member by booms or out riggers. The movement of the outboard members is transmitted to spars pivoted to levers which are pivotally fulcrumed upon the gunwales of said center member. The inboard portion of the levers connecting with substantially downwardly extending racks adapted to alternately engage with cog drums which drive a center shaft. The power from this shaft is controlled by means of clutch and gearing.

I wish also to point out the advantage of spring 35. This spring will take up quick shocks caused by sudden waves or heavy swells, said spring coiling tightly in such cases and then gradually uncoiling, thus transmits its coiled energy and regulating the speed of the propeller.

Claims—

1. A wave motor having three oblong floats, booms attached to and projecting fore and aft from both sides of central float, loop members loosely connecting said side floats to said booms, levers fulcrumed to opposite sides of the central float their inboard and outboard ends having a vertical movement, guide rods mounted on the side floats to loosely confine the outer ends of said levers, a motor shaft mounted lengthwise in the central float and means for transmitting the vertical movement of the inboard ends of said levers to operate said shaft.

2. A wave motor having three oblong floats, booms attached to and projecting fore and aft from both sides of central float, loop members loosely connecting said side floats to said booms, levers fulcrumed to opposite sides of the central float their inboard and outboard ends having a vertical movement, guide rods mounted on the side floats to loosely confine the outer ends of said levers, a motor shaft mounted lengthwise on the central float, means for transmitting the vertical movement of the inboard ends of said levers to operate said shaft and a spring controlled shock absorber for said shaft.

In testimony that I claim the foregoing as my own, I affix my signature.

ROBERT HINCKLEY.